United States Patent
Freeman

(10) Patent No.: US 7,201,353 B1
(45) Date of Patent: Apr. 10, 2007

(54) ADJUSTABLE LECTERN SYSTEM

(76) Inventor: Yolanda Freeman, 5114 S. Greenwood, Chicago, IL (US) 60615

( * ) Notice: Subject to any disclaimer, the term of this patent is extended or adjusted under 35 U.S.C. 154(b) by 211 days.

(21) Appl. No.: 10/455,952

(22) Filed: Jun. 6, 2003

(51) Int. Cl.
*F16M 11/00* (2006.01)

(52) U.S. Cl. .................... 248/161; 248/188.5

(58) Field of Classification Search .......... 248/449, 248/444, 443, 420, 407, 292.12, 188.5, 161, 248/157, 125.8, 125.2; 108/147.19, 147, 108/69
See application file for complete search history.

(56) References Cited

U.S. PATENT DOCUMENTS

| | | | | |
|---|---|---|---|---|
| 3,091,886 A | * | 6/1963 | Nutting | 248/445 |
| 3,823,312 A | * | 7/1974 | Weinstein | 362/99 |
| 3,848,944 A | | 11/1974 | Gilmer, Jr. | |
| 3,934,806 A | * | 1/1976 | Rady | 248/441.1 |
| 4,165,856 A | * | 8/1979 | Wiseheart | 248/449 |
| 4,339,104 A | * | 7/1982 | Weidman | 248/407 |
| 4,850,563 A | * | 7/1989 | Grout | 248/422 |
| D305,026 S | * | 12/1989 | Wolf | D14/229 |
| 5,242,145 A | | 9/1993 | Linnell | |
| 5,322,255 A | * | 6/1994 | Garrett | 248/299.1 |
| 5,706,739 A | * | 1/1998 | Shaheen et al. | 108/147 |
| 5,884,888 A | * | 3/1999 | Grimes et al. | 248/441.1 |
| 5,979,856 A | | 11/1999 | Hsu | |
| 6,202,973 B1 | * | 3/2001 | Navarin et al. | 248/444 |
| 6,224,027 B1 | * | 5/2001 | Johnson et al. | 248/125.8 |
| 2003/0051355 A1 | * | 3/2003 | Phuly et al. | 33/286 |

FOREIGN PATENT DOCUMENTS

DE 3303193 A1 * 8/1984

* cited by examiner

*Primary Examiner*—A. Joseph Wujciak

(57) ABSTRACT

A adjustable lectern system for facilitating adjustment and movement according to the particular needs of various sequential users. The adjustable lectern system includes a base portion designed for resting upon a horizontal support surface and having a relatively broad first circumference providing stability against tipping for the system, a columnar support assembly positioned on a central portion of the base portion and having a second circumference less than the first circumference, and adjustable support assembly is operationally coupled to the columnar support and designed for supporting papers positioned upon the system.

16 Claims, 3 Drawing Sheets

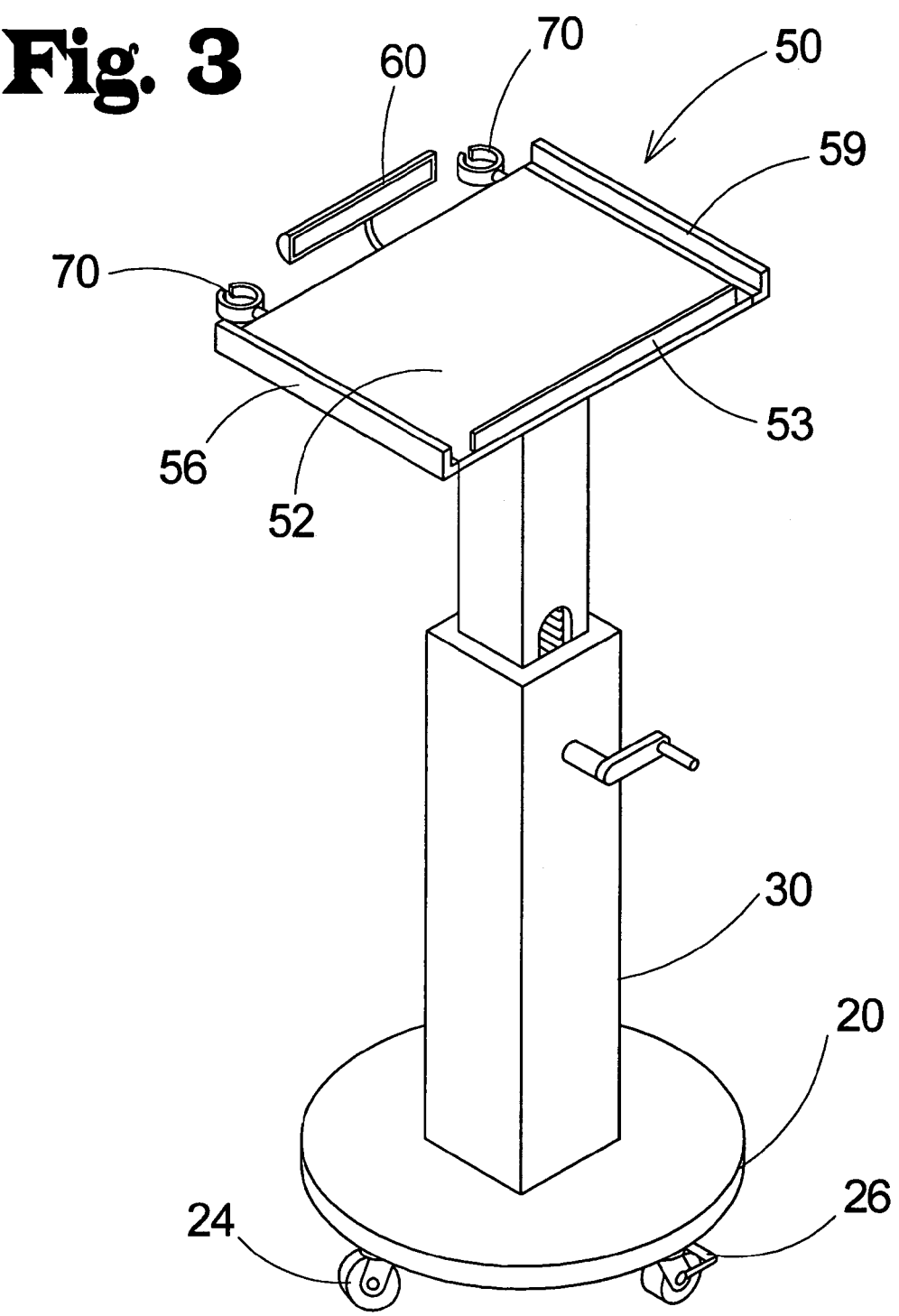

ADJUSTABLE LECTERN SYSTEM

BACKGROUND OF THE INVENTION

1. Field of the Invention

The present invention relates to support stands and more particularly pertains to a new adjustable lectern system for facilitating adjustment and movement according to the particular needs of various sequential users.

2. Description of the Prior Art

The use of support stands is known in the prior art. U.S. Pat. No. 5,979,856 describes a system for holding sheet music. Another type of support stands is U.S. Pat. No. 3,848,944 having a enclosed public address system.

While these devices fulfill their respective, particular objectives and requirements, the need remains for a system which is not tethered by wires.

SUMMARY OF THE INVENTION

The present invention meets the needs presented above by providing a battery operated illumination system and microphone clips compatible with wireless microphones.

Another object of the present invention is to provide a new adjustable lectern system that can be quickly adjusted to accommodate the height of various users.

Still another object of the present invention is to provide a new adjustable lectern system that has an expandable support for papers to accommodate the needs of various users.

Even still another object of the present invention is to provide a new adjustable lectern which can be readily moved during use.

To this end, the present invention generally comprises a base portion designed for resting upon a horizontal support surface and having a relatively broad first circumference providing stability against tipping for the system, a columnar support assembly positioned on a central portion of the base portion and having a second circumference less than the first circumference, and adjustable support assembly is operationally coupled to the columnar support and designed for supporting papers positioned upon the system.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a schematic perspective view of the present invention.

DESCRIPTION OF THE PREFERRED EMBODIMENT

Figure 1:
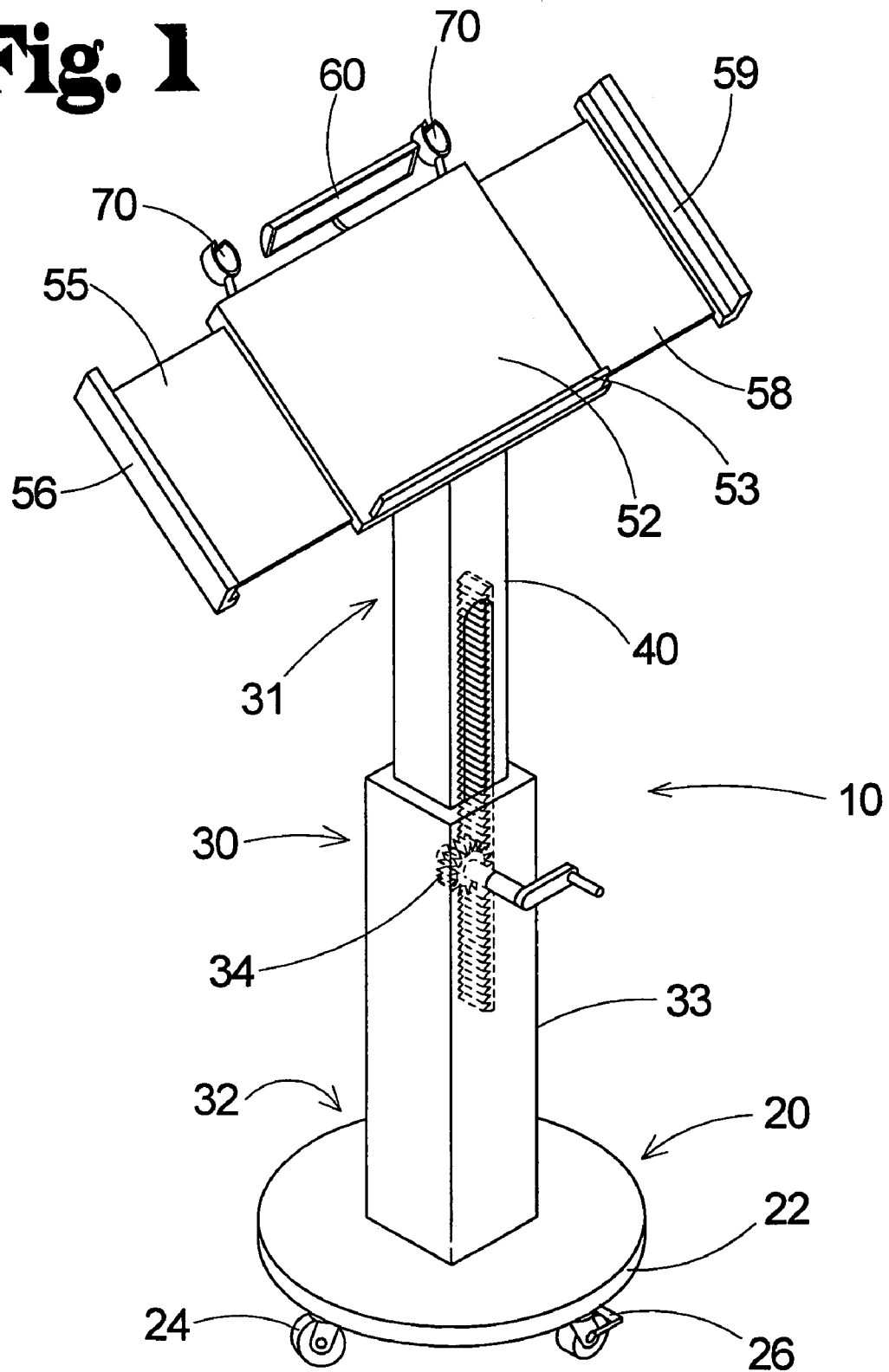
FIG. 1 is a schematic perspective view of a new adjustable lectern system according to the present invention.
Figure 2:
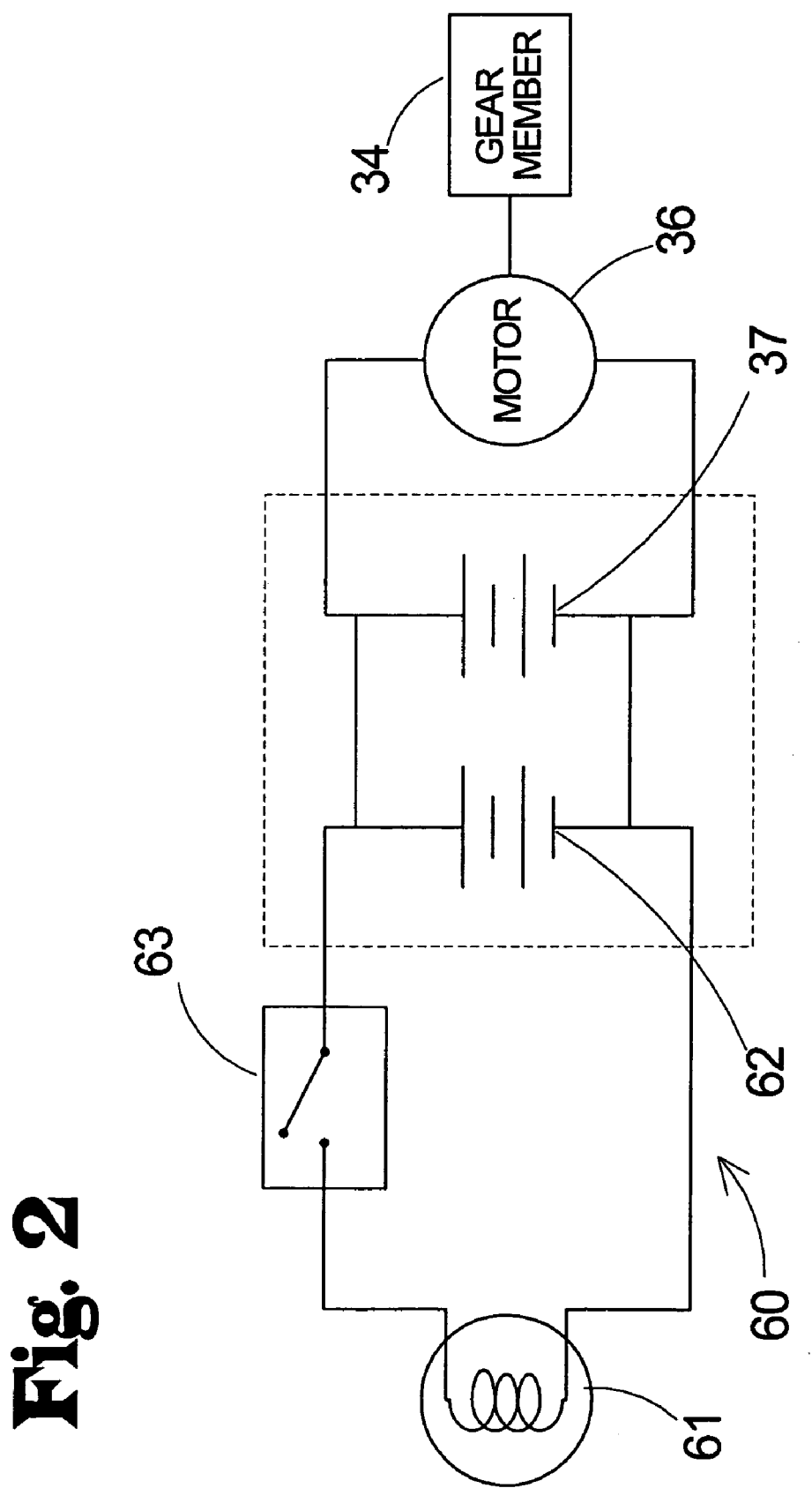
FIG. 2 is a schematic functional interconnect view of the present invention.

With reference now to the drawings, and in particular to FIGS. 1 through 3 thereof, a new adjustable lectern system embodying the principles and concepts of the present invention and generally designated by the reference numeral 10 will be described.

As best illustrated in FIGS. 1 through 3, the adjustable lectern system 10 generally comprises a base portion 20, a columnar support assembly 30, and an adjustable support assembly 50.

The base portion 20 is designed for resting upon a horizontal support surface. The base portion 20 has a relatively broad first circumference providing stability against tipping for the system 10.

The columnar support assembly 30 has a first end 31 and a second end 32. The columnar support assembly 30 is preferably positioned on a central portion of the base portion 20. The columnar support assembly 30 has a second circumference less than the first circumference.

The adjustable support assembly 50 is operationally coupled to the second end 32 of the columnar support 30. The adjustable support assembly 50 is designed for supporting papers positioned upon the system 10.

A plurality of wheels 24 is preferably operationally coupled to a bottom 22 of the base portion 20. The plurality of wheels 24 facilitate rolling the adjustable lectern system 10 along the horizontal support surface.

A locking member 26 may be used for selectively securing at least one of the plurality of wheels 24 in a static position to facilitate maintaining the system 10 in a static position relative to the horizontal support surface.

In an embodiment the columnar support assembly 30 further comprises a lower portion 33, an upper portion 40, a toothed track portion 42, a gear member 34, and a handle portion 35. The lower portion 33 is substantially hollow, and the upper portion 40 is slideably receivable within the lower portion 33. The toothed track portion 41 is preferably coupled to the upper portion 40. The gear member 34 preferably is rotatably coupled to the lower portion 33. The gear member 34 engages the toothed track portion 41. The handle portion 35 extends from the lower portion 33 for facilitating rotation of the gear member 34. Thus, the toothed track 41 moves relative to the gear member 34 and the upper portion 40 moves relative to the lower portion 33.

In an embodiment the adjustable support assembly 50 further comprises a main support member 52 and a lower lip 53. The main support member 52 is preferably pivotally coupled to the second end 32 of the columnar support assembly 30. The lower lip 53 is positioned along a bottom edge of the main support member 52. The lower lip 53 is for supporting papers placed on the main support member 52 when the main support member 52 is positioned in a non-horizontal position.

In a further embodiment, a left extension member 55 is slideably coupled to the main support member 52. The left extension member 55 expands a surface of the adjustable support assembly 50. A left lip 56 may be positioned along a side edge of the left extension member 55 for inhibiting papers positioned on the adjustable support assembly 50 from sliding off a left edge of the adjustable support assembly 50.

In still a further embodiment, a right extension member 58 is also slideably coupled to the main support member 52. The right extension member 58 expands a surface of the adjustable support assembly 50. A right lip 59 may be positioned along a side edge of the right extension member 58 for inhibiting papers positioned on the adjustable support assembly 50 from sliding off a right edge of the adjustable support assembly 50.

A lamp assembly 60 may be positioned along a top edge of the main support member 52. The lamp assembly 60 provides illumination for papers positioned upon the main support member 52.

In a preferred embodiment, the lamp assembly 60 includes an illumination member 61 for converting electrical energy into light, an energy storage device 62 for storing electrical energy until needed, and a switch member 63 for controlling operation of the illumination member 61. Illustrative examples of energy storage devices include but certainly are not limited to batteries, fuel cells, and capacitors.

Preferably at least one microphone clip 70 is pivotally coupled to the main support member 52 for selectively receiving a microphone.

In an embodiment the main support member 52 has an overall width of 24 inches.

In a further embodiment the right 58 and left extension members 55 each have an extended width of 8 inches, and when both are extended the adjustable support assembly 50 has an overall with of 40 inches.

In still a further embodiment the columnar support assembly 30 further comprises a motor assembly 36 operationally coupled to and an energy storage device 37 for providing electrical energy to the motor assembly 36.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An adjustable lectern system comprising:
   a base portion adapted for resting upon a horizontal support surface,
   said base portion having a first circumference;
   a columnar support assembly having a first end and a second end, said columnar support assembly being positioned on a central portion of said base portion, said columnar support assembly having a second circumference less than said first circumference;
   an adjustable support assembly operationally coupled to said second end of said columnar support, said adjustable support assembly being adapted for supporting papers;
   wherein said columnar support assembly further comprises a lower portion and an upper portion, said lower portion being substantially hollow, said upper portion being slideably receivable within said lower portion;
   wherein said columnar support assembly further comprises a adjustment means for selectively positioning said upper portion within said lower portion for adjusting an overall height of said columnar support assembly;
   wherein said adjustment means further comprises:
      a toothed track portion coupled to said upper portion:
      a gear member rotatably coupled to said lower portion, said gear member engaging said toothed track portion: and
      a handle portion extending from said lower portion for facilitating rotation of said gear member whereby said toothed track moves relative to said gear member and said upper portion moves relative to said lower portion;
   wherein said upper portion of said columnar support is substantially hollow, said track portion being positioned in an interior of said upper portion of said columnar support;
   wherein said gear member is positioned in said upper portion of said columnar support:
   wherein said upper portion of said columnar support has a pair of opposed slots into the substantially hollow interior of said upper portion.

2. The system of claim 1, wherein said base portion further comprises a plurality of wheels operationally coupled to a bottom said of said base portion, said plurality of wheels facilitating rolling said adjustable lectern system along the horizontal support system.

3. The system of claim 2, wherein at least one of said plurality of wheels further comprises a locking member for selectively securing said wheel in a static position to facilitate maintaining said system in a static position relative to the horizontal support surface.

4. The system of claim 1, wherein said adjustable support assembly further comprises:
   a main support member pivotally coupled to said second end of said columnar support assembly; and
   a lower lip positioned along a bottom edge of said main support member, said lower lip being for supporting papers placed on said main support member when said main support member is positioned in a non-horizontal position.

5. The system of claim 4, further comprising a left extension member slideably coupled to said main support member, said left extension member expanding a surface of said adjustable support assembly.

6. The system of claim 5, wherein said left extension member further comprises a left lip positioned along a side edge of said left extension member for inhibiting papers positioned on said adjustable support assembly from sliding off a left edge of said adjustable support assembly.

7. The system of claim 4, further comprising a right extension member slideably coupled to said main support member, said right extension member expanding a surface of said adjustable support assembly.

8. The system of claim 7, wherein said right extension member further comprises a right lip positioned along a side edge of said right extension member for inhibiting papers positioned on said adjustable support assembly from sliding off a right edge of said adjustable support assembly.

9. The system of claim 4, wherein said adjustable support assembly further comprises a lamp assembly positioned along a top edge of said main support member, said lamp assembly providing illumination for papers positioned upon said main support member.

10. The system of claim 4, further comprising at least one microphone clip pivotally coupled to said main support member for selectively receiving a microphone.

11. The system of claim 1 wherein said handle member extends through said opposed slots and through said upper portion of said columnar support.

12. An adjustable lectern system comprising:
a base portion adapted for resting upon a horizontal support surface,
said base portion having a first circumference;
a columnar support assembly having a first end and a second end, said
columnar support assembly being positioned on a central portion of said base portion, said columnar support assembly having a second circumference less than said first circumference;
an adjustable support assembly operationally coupled to said second end of said columnar support, said adjustable support assembly being adapted for supporting;
a plurality of wheels operationally coupled to a bottom said of said base portion, said plurality of wheels facilitating rolling said adjustable lectern system along the horizontal support system;
a locking member for selectively securing at least one of said plurality of wheels in a static position to facilitate maintaining said system in a static position relative to the horizontal support surface;
wherein said columnar support assembly further comprises: a lower portion and an upper portion, said lower portion being substantially hollow, said upper portion being slideably receivable within said lower portion; a toothed track portion coupled to said upper portion; a gear member rotatably coupled to said lower portion, said gear member engaging said toothed track portion; and a handle portion extending from said lower portion for facilitating rotation of said gear member whereby said toothed track moves relative to said gear member and said upper portion moves relative to said lower portion;
wherein said adjustable support assembly further comprises: a main support member pivotally coupled to said second end of said columnar support assembly; and a lower lip positioned along a bottom edge of said main support member, said lower lip being for supporting papers placed on said main support member when said main support member is positioned in a non-horizontal position;
a left extension member slideably coupled to said main support member, said left extension member expanding a surface of said adjustable support assembly;
a left lip positioned along a side edge of said left extension member for inhibiting papers positioned on said adjustable support assembly from sliding off a left edge of said adjustable support assembly;
a right extension member slideably coupled to said main support member, said right extension member expanding a surface of said adjustable support assembly;
a right lip positioned along a side edge of said right extension member for inhibiting papers positioned on said adjustable support assembly from sliding off a right edge of said adjustable support assembly;
a lamp assembly positioned along a top edge of said main support member, said lamp assembly providing illumination for papers positioned upon said main support member;
at least one microphone clip pivotally coupled to said main support member for selectively receiving a microphone;
wherein said upper portion of said columnar support is substantially hollow, said track portion being positioned in said upper portion of said columnar support, said gear member being positioned in said upper portion of said columnar support, said upper portion of said columnar support having a pair of opposed slots into the substantially hollow interior of said upper portion, said handle member extending through said opposed slots and through said upper portion of said columnar support.

13. The system of claim 12, wherein said main support member having an overall width of 24 inches.

14. The system of claim 13, wherein said right and left extension members each have an extended width of 8 inches.

15. The system of claim 12, wherein said lamp assembly further comprises:
    an illumination member for converting electrical energy into light;
    an energy storage device for storing electrical energy until needed; and
    a switch member for controlling operation of said illumination member.

16. The system of claim 12, further wherein said columnar support assembly further comprises:
    a motor assembly operationally coupled to said gear member for selectively rotating said gear member; and
    an energy storage device for providing electrical energy to said motor assembly.

* * * * *